United States Patent
Kozhaya et al.

(10) Patent No.: US 11,222,281 B2
(45) Date of Patent: Jan. 11, 2022

(54) CLOUD SHARING AND SELECTION OF MACHINE LEARNING MODELS FOR SERVICE USE

(71) Applicant: International Business Machines Corporation, Armonk, NY (US)

(72) Inventors: Joseph N. Kozhaya, Morrisville, NC (US); Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 16/018,284

(22) Filed: Jun. 26, 2018

(65) Prior Publication Data

US 2019/0391956 A1 Dec. 26, 2019

(51) Int. Cl.
*G06N 20/00* (2019.01)
*G06F 8/36* (2018.01)
*G06F 9/445* (2018.01)
*G06F 16/332* (2019.01)
*G06N 20/20* (2019.01)

(52) U.S. Cl.
CPC ............... *G06N 20/00* (2019.01); *G06F 8/36* (2013.01); *G06F 9/44521* (2013.01); *G06F 16/3329* (2019.01); *G06N 20/20* (2019.01)

(58) Field of Classification Search
CPC .... G06N 20/00; G06N 20/20; G06F 16/3329; G06F 8/36; G06F 9/44521
USPC .......................................................... 706/12
See application file for complete search history.

(56) References Cited

U.S. PATENT DOCUMENTS

| | | | |
|---|---|---|---|
| 9,135,559 B1 * | 9/2015 | Chan | G06F 16/248 |
| 2014/0156568 A1 | 6/2014 | Ganguly et al. | |
| 2015/0170053 A1 | 6/2015 | Miao | |
| 2016/0110657 A1 | 4/2016 | Gibiansky et al. | |
| 2016/0358098 A1 * | 12/2016 | Duesterwald | G06N 20/20 |
| 2018/0005296 A1 | 1/2018 | Eades et al. | |

OTHER PUBLICATIONS

Feuz et al., "Ranking and automatic selection of machine learning models," Dec. 13, 2017, Technical Disclosure Commons, http://www.tdcommons.org/dpubs_series/982, (34 pages—pp. 1-34) (Year: 2017).*

Price E., Masood A., Aroraa G. (2021) The Power of Cognitive Services. In: Hands-on Azure Cognitive Services. Apress, Berkeley, CA. Chapter 1 (pp. 1-20) https://doi.org/10.1007/978-1-4842-7249-7_1 (Year: 2021).*

(Continued)

*Primary Examiner* — James D. Rutten
(74) *Attorney, Agent, or Firm* — VanLeeuwen & VanLeeuwen; Christopher M. Pignato

(57) ABSTRACT

An approach is provided in which an information handling system performs multiple tests using a cognitive service and multiple trained machine learning models on user data corresponding to a user application. For each of the multiple tests, a different one of the trained machine learning models is utilized. The information handling system generates results from the tests and then selects at least one of the trained machine learning models based on the test results. In turn, the information handling system assigns the cognitive service and the selected trained machine learning models to the user application.

17 Claims, 7 Drawing Sheets

(56) References Cited

OTHER PUBLICATIONS

Disclosed Anonymously, "Ranking and Automatic Selection of Machine Learning Models," IPCOM000252275D, Jan. 3, 2018, 34 pages.
'Machine Learning made beautifully simple, BigML, Feb. 2015, 2 pages.
"Focused information criterion," Wikipedia, Nov. 2017, 2 pages.
"Association rule learning," Wikipedia, Mar. 2018, 11 pages.
"Azure Machine Learning Studio," Microsoft, downloaded Apr. 2018, 10 pages.
"Model Selection," Wikipedia, Feb. 2018, 4 pages.
"Build more intelligent apps with machine learning," Apple, downloaded Feb. 2018, 4 pages.

* cited by examiner

CLOUD SHARING AND SELECTION OF MACHINE LEARNING MODELS FOR SERVICE USE

BACKGROUND

Cognitive computing enables computers to employ human-like intelligence by simulating human thought processes in computerized models. Cognitive computing involves self-learning systems that use data mining, pattern recognition and natural language processing to mimic the way the human brain functions.

Cognitive Services, such as visual recognition, conversation, speech to text, language translation, packages cognitive computing machine learning algorithms into discrete components that are easy for users to interface with their applications. Today's cognitive services are bundled with default machine learning models that have been trained on a set of representative training data (referred to as ground truth), which typically covers a wide range of topics.

For a user's application to gain full benefit of a cognitive service, the user should train the cognitive service's machine learning models on a representative set of data. For example, if user's application pertains to a specific topic (e.g., financial, travel, healthcare, etc.), the user should train the machine learning models with question/answer pairs relevant to the specific industry to improve the accuracy of the corresponding cognitive service. However, creating representative training data to train machine learning models is usually a complex, expensive, and tedious task that requires subject matter expertise. As a result, users typically utilize the default models that are bundled with the cognitive service, which are not optimized for the user's application and cause the cognitive service to produce sub-optimum results.

BRIEF SUMMARY

According to one embodiment of the present disclosure, an approach is provided in which an information handling system performs multiple tests using a cognitive service and multiple trained machine learning models on user data corresponding to a user application. For each of the multiple tests, a different one of the trained machine learning models is utilized. The information handling system generates results from the tests and then selects at least one of the trained machine learning models based on the test results. In turn, the information handling system assigns the cognitive service and the selected trained machine learning models to the user application.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) performing a plurality of tests on user data using a cognitive service and a plurality of trained models, wherein a different one of the plurality of trained models is utilized for each of the plurality of tests, and wherein the user data corresponds to a user application; (ii) selecting at least one of the plurality of trained models based, at least in part, on a plurality of test results generated from the plurality of tests; and (iii) assigning the cognitive service and the selected at least one trained model to the user application.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
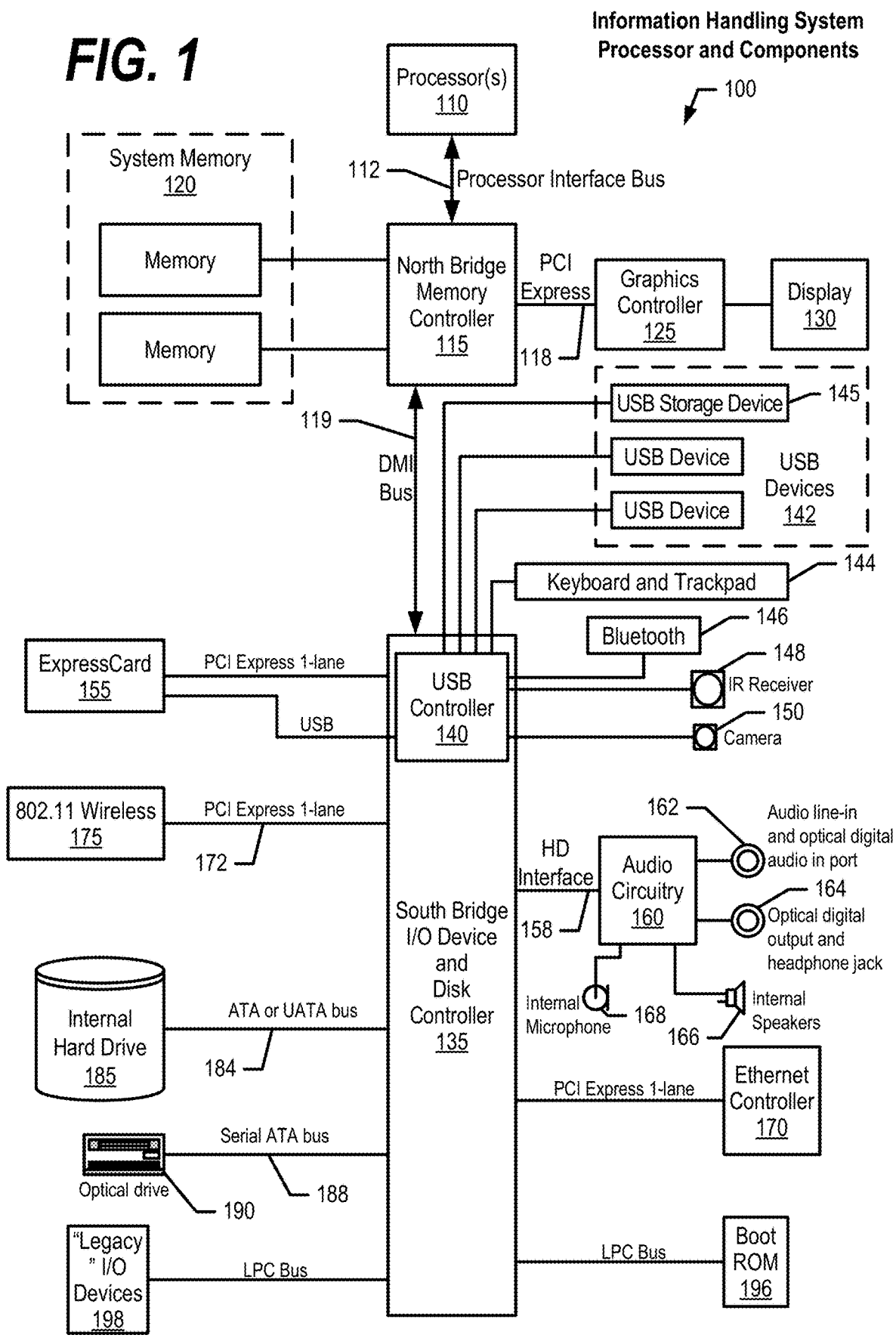
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein.

Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
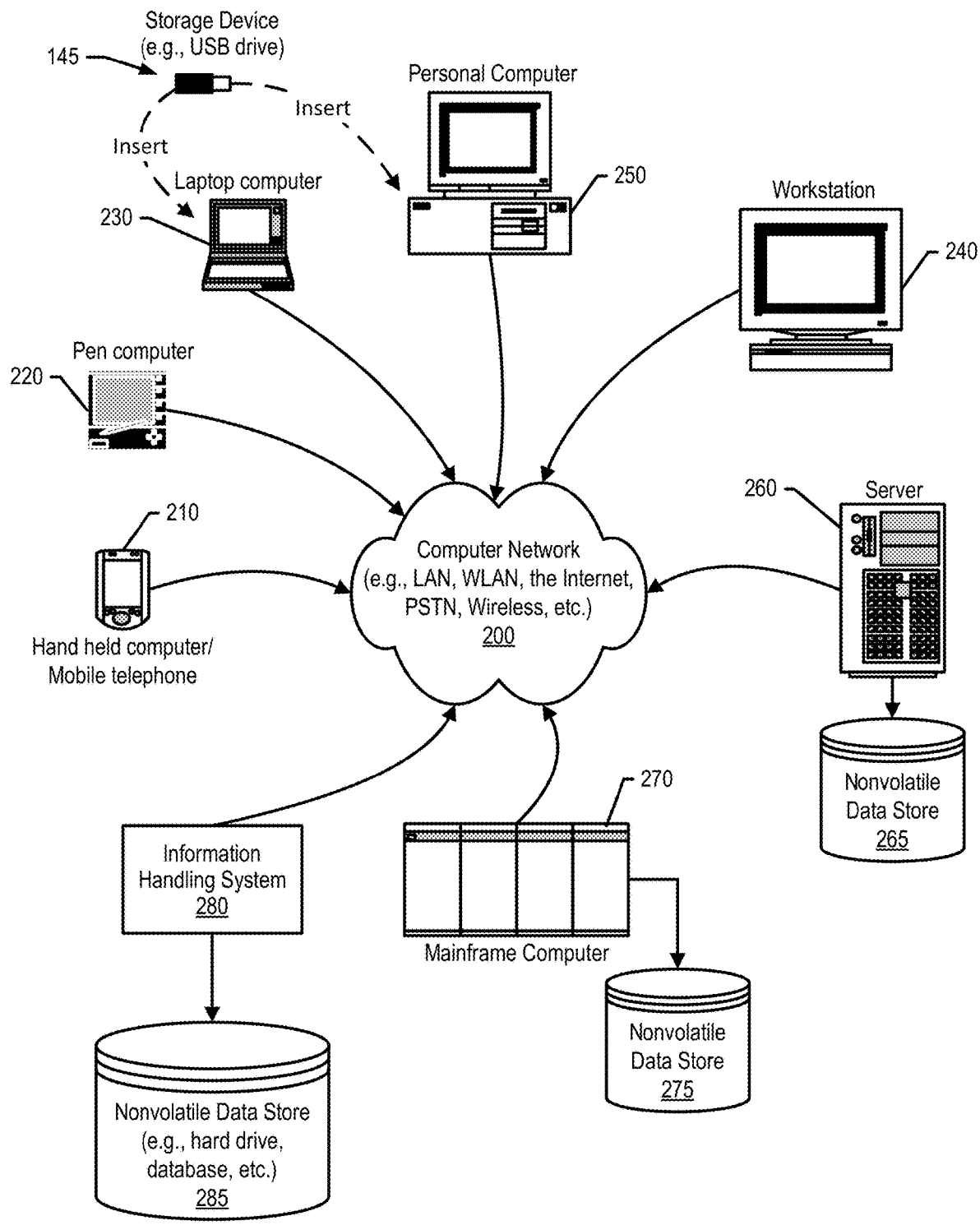
FIG. 2 provides an extension of the information handling system environment shown in FIG. 1 to illustrate that the methods described herein can be performed on a wide variety of information handling systems which operate in a networked environment

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, cognitive services are typically bundled (e.g., bound) to default machine learning models (also referred to herein as "models") that have been trained and proven on a set of ground truth (e.g., question/answer pairs). To accommodate a wide range of users, the ground truth may not be very specific in any one topic or category.

For example, a natural language classifier may be trained on a particular language, but not on a specific field (e.g., medical) or even a subtopic of a field (e.g. diabetes). FIGS. 3 through 7 depict an approach that can be executed on an information handling system that allows users to provide sample data to a cognitive services deployment system and the cognitive services deployment system selects the best, already trained, machine learning models to bind to their cognitive services. In one embodiment, the cognitive services deployment system employs a machine learning model "exchange" where machine learning expert providers offer machine learning models for a fee and leverage natural language query classification to identify the best set of machine learning models for different user applications.

The cognitive services deployment system performs dynamic binding of machine learning models to cognitive services at runtime or deployment time. This is in contrast to prior systems that perform static binding during cognitive services construction that are pre-determined and only changeable by reconstructing the cognitive service. As a result, the cognitive services deployment system described herein may change a cognitive service's machine learning model over time as a user's data changes. In one embodiment, the cognitive services deployment system may re-bind the corresponding machine learning model each time the façade is called. In another embodiment, the cognitive services deployment system may track previous requests and evaluate/re-bind the machine learning model based on the last "X" requests.

In one embodiment, the cognitive services deployment system leverages cloud and machine learning model containers in hosting an exchange of a variety of machine learning models and instrumenting a solution that dynamically links the best-suited machine learning model to each user data set based on an evaluation the cognitive services deployment system runs against that sample data. In another embodiment, the cognitive services deployment system utilizes a façade (simplified interface to a larger body of code) where an invocation of a selected and bound machine learning model sits outside the user's application and is executed as a just-in time request to get prediction values for the request or the outcome of a request based on data that may be sample data or real-time/production data.

Figure 3:
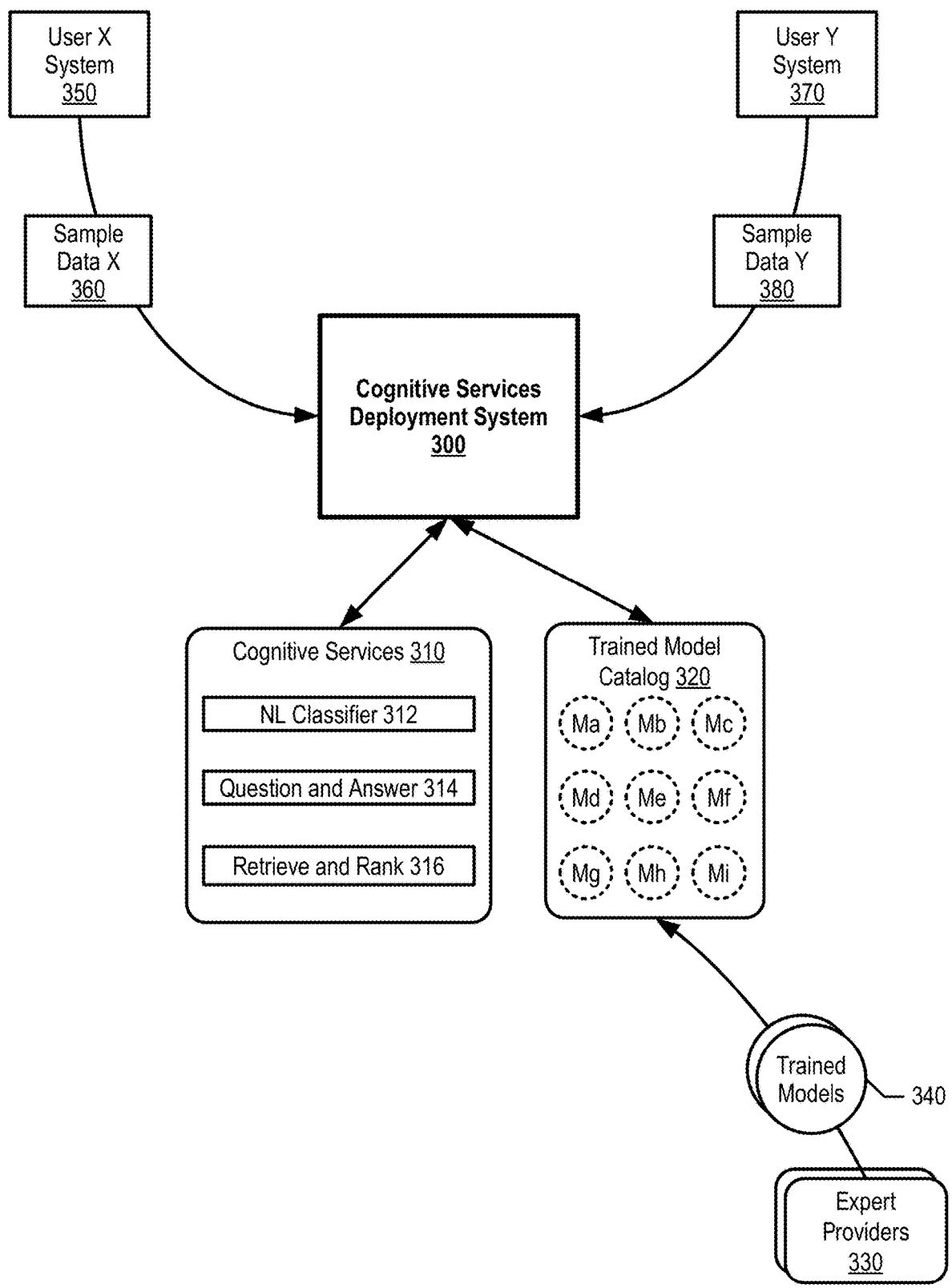
FIG. 3 is an exemplary diagram depicting a cognitive services deployment system analyzing user data to determine a best-suited, already trained, machine learning model and dynamically binding the already trained machine learning model to a cognitive service.

FIG. 3 is an exemplary diagram depicting a cognitive services deployment system analyzing user data to determine a best-suited, already trained, machine learning model and dynamically binding the already trained machine learning model to a cognitive service.

Cognitive services deployment system 300 uses cognitive services 310 in combination with machine learning models in trained model catalog 320 to analyze user data and determine a best combination of cognitive services with trained machine learning models to link to a user's application. Cognitive services 310 include natural language classifier service 312, question and answer service 314, and retrieve and rank service 316. As those skilled in the art can appreciate, cognitive services 310 may include more, less, and/or different services that what is shown in FIG. 3 and described herein.

Each of cognitive services 312, 314, and 316 have been trained using specific machine models and may be considered "default" machine learning models that are historically bundled with their with respective cognitive service. These default machine learning models may be included in trained model catalog 320 as optional machine learning model based on the user's sample data. In addition to the default machine learning models, trained model catalog 320 includes a repository of machine learning models Ma, Mb, Mc, Md, Me, Mf, Mg, Mh, Mi, that are trained by, for example, expert providers 330. Expert providers 330 may train machine learning models on specific data and offer the machine learning for a fee, such as training a natural language classifier to a particular disease (e.g., diabetes).

As expert providers 330 develop and train new trained models 340, they are stored in trained model catalog 320 for subsequent use by various users. Expert providers 330, in turn, may receive compensation when their particular models are utilized by other users. In one embodiment, expert providers 330 begin with a default machine learning model as a baseline and then enhance the default machine learning model by training them using specific topic training data.

User X system 350 begins by providing sample data X 360 to cognitive services deployment system 300 that is representative of the type of data user X system 350's application utilizes. For example, sample data X 360 may include text beginning with who/what/when/where/why/how and cognitive services deployment system 300 determines that user X system 350 requires question answer cognitive service 314. Cognitive services deployment system 300 evaluates sample data X 360 using a combination of the trained models in trained model catalog 320 with a set of the cognitive services 310 to determine which combination produces the best result based on sample data X 360. For example, a text string may be evaluated against a text-based cognitive service and images may be evaluated against image-based cognitive services (see FIGS. 5, 6, 7, and corresponding text for further details).

Figure 4:
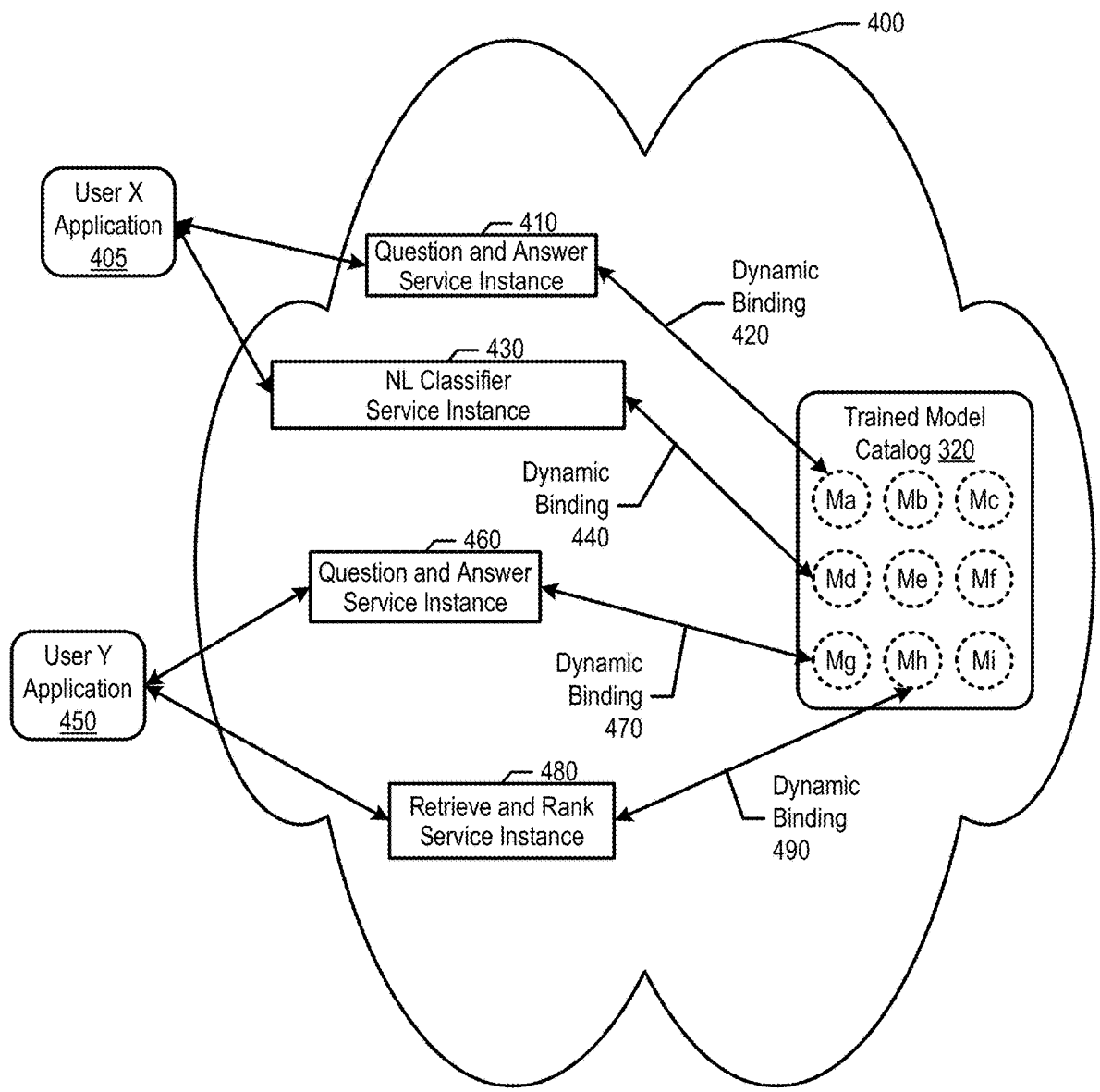
FIG. 4 is a diagram depicting user applications interfacing with deployed cognitive services that are dynamically linked to specific trained machine learning models based on prior analysis of sample data.

When testing completes, cognitive services deployment system 300 ranks the machine learning models and the cognitive services based on the test results (e.g., percent of correct answers) and dynamically links the highest ranking cognitive service/machine learning models combination to the cognitive service during deployment/runtime (see FIG. 4 and corresponding text for further details).

Likewise, user Y system 370 provides sample data Y 380 to cognitive services deployment system 300 and requests cognitive services. Cognitive services deployment system 300 evaluates sample data Y 380 using a combination of the trained models in trained model catalog 320 with a set of the cognitive services 310 to determine which combination produces the best result. When testing completes, cognitive services deployment system 300 ranks the machine learning models and dynamically links the highest ranking machine learning model to the cognitive service during deployment/runtime (see FIG. 4 and corresponding text for further details).

As shown in FIG. 4, cognitive services deployment system 300 enhances both user X application 405's cognitive services and user Y application 450's cognitive services precision and capability by dynamically linking (binding) different machine learning models from trained model catalog 320 based on analysis of the user's sample data. The trained models are unmodified and did not require retraining, thus eliminating time and costs to retrain or reconstruct machine learning model models as discussed above.

FIG. 4 is a diagram depicting user applications interfacing with deployed cognitive services that are dynamically linked to specific trained machine learning models based on prior analysis of sample data. Referring back to FIG. 3, cognitive services deployment system 300 evaluated sample data X 360 and, FIG. 4 shows, that cognitive services deployment system 300 determined that question and answer service 314 dynamically linked to trained model Ma, and natural language classifier service 312 dynamically linked to trained model Md is a best combination to support user X application 405 (executing on user X system 350). As such, cognitive services deployment system 300 deploys, on cloud 400, question and answer service instance 410 with dynamic binding 420 to trained model Ma, and deploys natural language classifier service instance 430 with dynamic binding 440 trained model Md to be utilized by user X application 405. Cloud 400 may be a public cloud, a private cloud, a hybrid cloud, or any other type of accessible computer network.

Likewise, cognitive services deployment system 300 evaluated sample data Y 380 (from FIG. 3) and determined that question and answer service 314 dynamically linked to trained model Mg, and retrieve and rank service 316 dynamically linked to trained model Mh is a best combination to support user Y application 450 (executing on user Y system 370). As such, referring to FIG. 4, cognitive services deployment system 300 deploys question and answer service instance 460 with dynamic binding 470 to trained model Mg, and retrieve and rank service instance 480 with dynamic binding 490 to trained model Mh to be utilized by user Y application 450.

Figure 5:
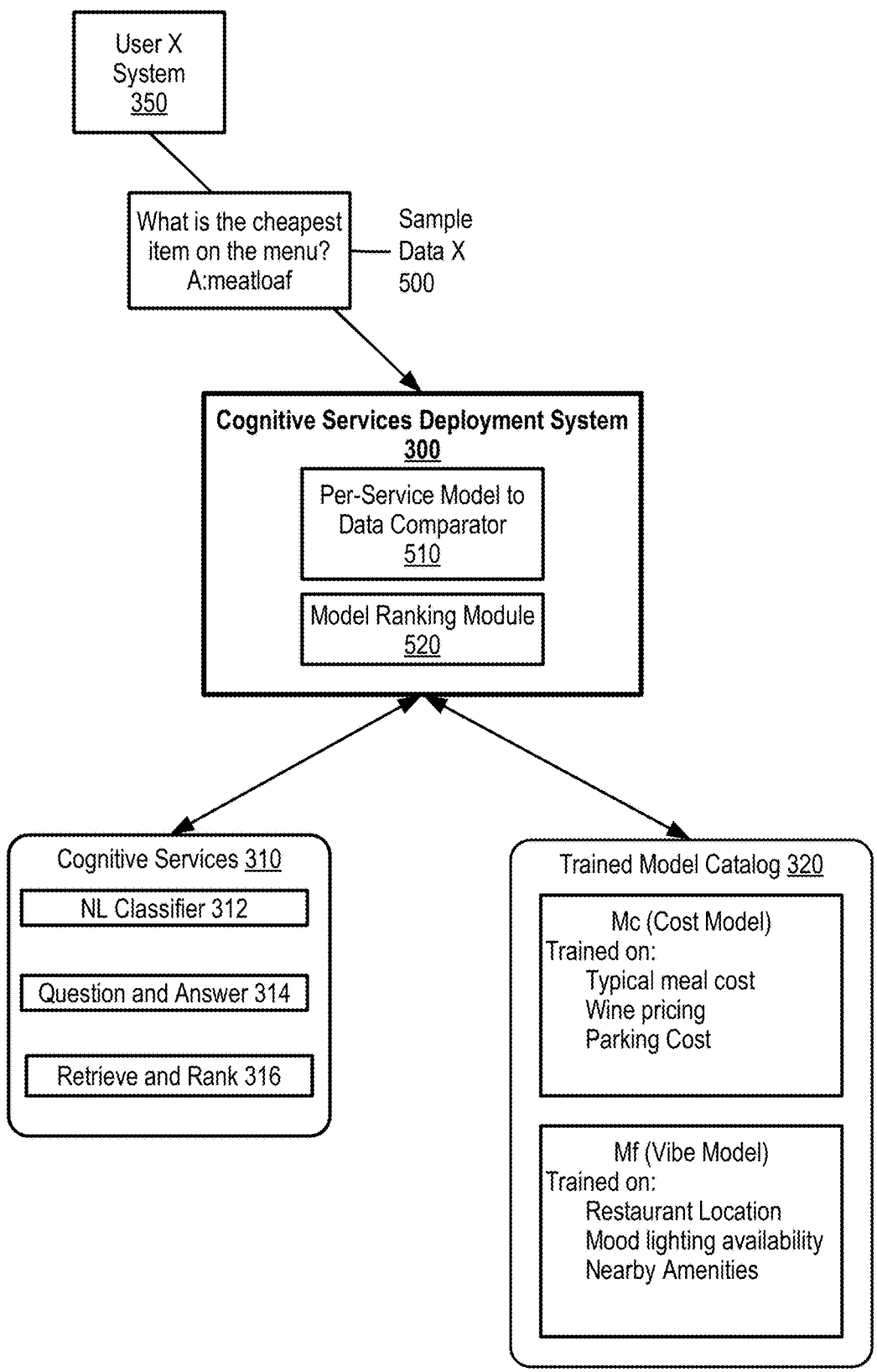
FIG. 5 is a diagram depicting an example of cognitive services deployment system 300 determining a best-suited machine learning model for a user application.

FIG. 5 is a diagram depicting an example of cognitive services deployment system 300 determining a best-suited machine learning model for a user application. Trained model catalog 320 includes machine learning models Mc and Mf. Each of machine learning models Mc and Mf were trained to help people select restaurants at which to eat, but each model has been trained differently by, for example, expert providers 330. Model Mc has been trained on weighing the "cost" of attending a restaurant over other factors by being trained on features/questions such as "How much is a typical meal?" "Do they have alcohol and what is the price range of the wines?", "How much does it cost to park?" Model Mf, however, has been trained on weighing the "experience" of attending a restaurant by being trained on features/questions such as "Where is the restaurant located?" "Is there mood lighting at the restaurant?" and "What amenities are close to the restaurant?"

Cognitive services deployment system 300 receives sample data X 500 and determines an appropriate classifier to classify the data. For example, if sample data X 500 is a collection of images then an image classifier may be selected. If sample data X 500 is long-form text then a document classifier may be selected. If sample data X 500 is short-form text then a natural language classifier may be selected. As can be seen, sample data X 500 is a question and answer pair and, therefore, cognitive services deployment system 300 selects a natural language classifier to classify sample data X 500.

Next, cognitive services deployment system 300 identifies possible cognitive services to support the sample data based on the classification. Using the example above, cognitive services deployment system 300 may select question and answer service 314 to test. Per-service model to data comparator 510 tests sample data X 500 first using the combination of question and answer service 314 with machine learning model Mc (cost model), and then tests sample data X 500 using the combination of question and answer service 314 with machine learning model Mf (vibe model).

Model ranking module 520 ranks answers generated from the two tests discussed above based on how close the answers are to the ground truth answer (meatloaf). For example, the first test with machine learning model Mc (cost model) may generate answers of "meatloaf" and "soft drink" and the second test with machine learning model Mf (vibe model) may generate answers of "123 Main Street." Model ranking module 520 then determines, based on the ranking, that machine learning model Mc (cost model) is the best trained model to link to an instance of question and answer service 314 during deployment. As discussed herein, machine learning model Mc remains unchanged and is not re-trained during the evaluation and deployment process.

Figure 6:
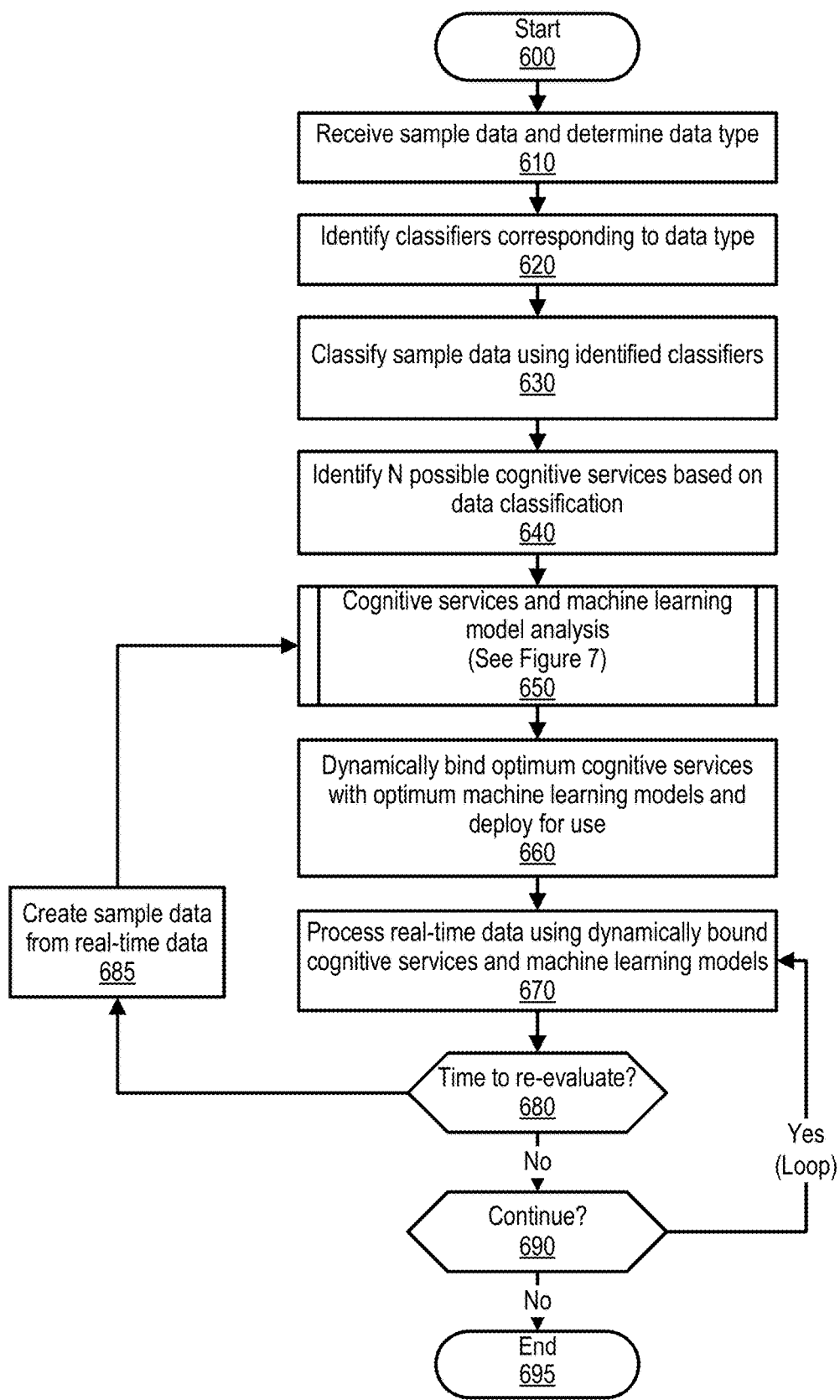
FIG. 6 is an exemplary flowchart showing steps taken to analyze a user's sample data and determine an optimum cognitive service/machine learning model combination.

FIG. 6 is an exemplary flowchart showing steps taken to analyze a user's sample data and determine an optimum cognitive service/machine learning model combination. FIG. 6 processing commences at 600 whereupon, at step 610, the process receives sample data (e.g., sample data X 360) and determines a data type. For example, the process may determine that the sample data is text-based and use a text classifier to determine if the sample data includes questions, is short-form, or long-form, etc.

At step 620, the process identifies classifiers that support the data type and, at step 630, the process classifies the sample data using the identified classifiers. For example, the process may determine that the sample data includes text and use a natural language classifier to classify the sample data. At step 640, the process identifies N possible cognitive services based on data classification. For example, the process may determine that a question answer cognitive service is one of the possible cognitive services for sample data that includes questions.

Figure 7:
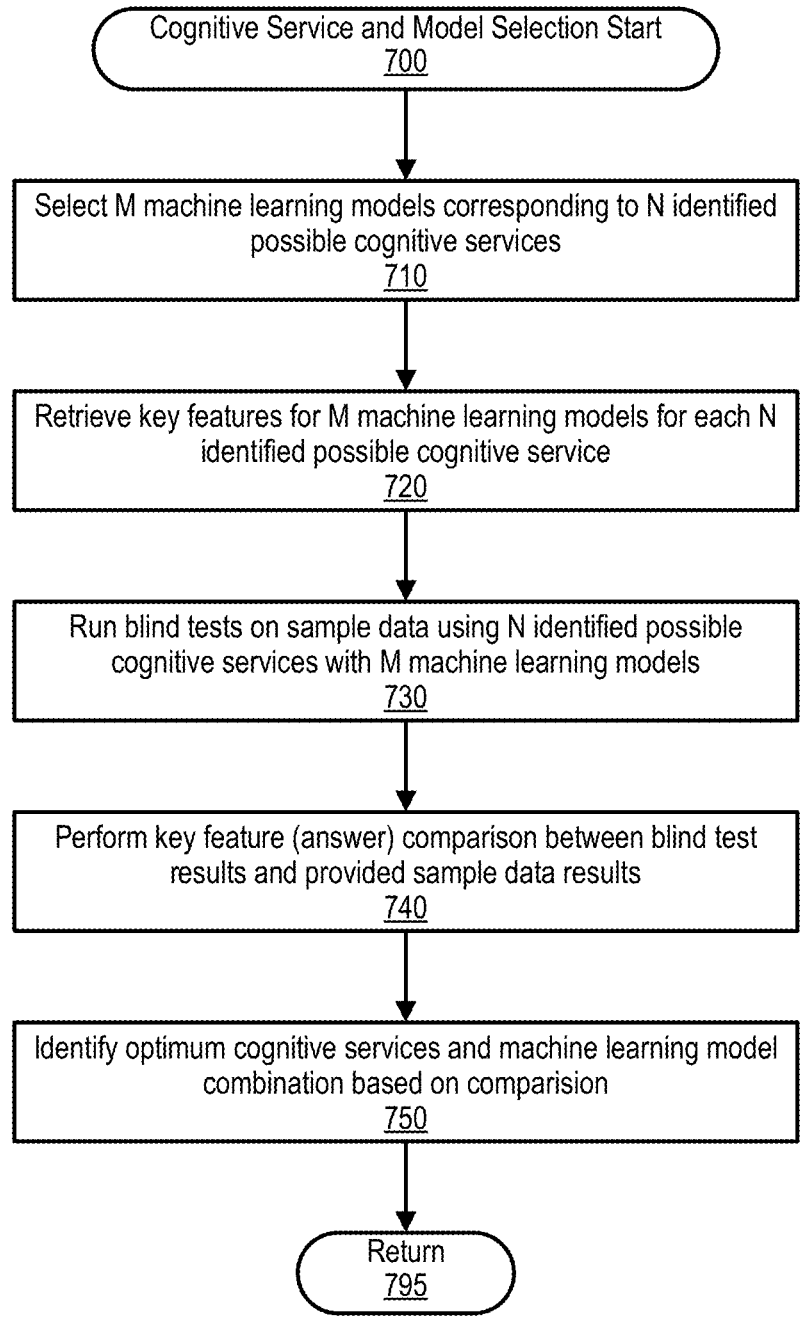
FIG. 7 is an exemplary flowchart showing steps taken to evaluate possible cognitive services with possible machine learning models and determine an optimum combination to process user sample data.

At predefined process 650, the process evaluates the sample data using the N possible cognitive services and M possible machine learning models (see FIG. 7 and corresponding text for processing details). At step 660, the process dynamically binds the optimum cognitive services with optimum machine learning models and deploys them for use.

At step 670, the process processes real-time data from the application using the bound cognitive service and the machine learning models. The process determines whether it is time to re-evaluate the selected cognitive service and machine learning models (decision 680). For example, the process may listen to user feedback and decide to retrain after X number of "thumbs down" votes.

If the process should re-evaluate the cognitive service/machine learning models combination, decision 680 branches the "Yes" branch, which loops back to create sample data from, for example, the already received real-time data at step 685 and proceeds to perform steps to select the optimum cognitive services/machine learning models combination. In one embodiment, the process considers feedback from prior analysis (e.g., thumbs up/thumbs down).

On the other hand, if it is not time to re-evaluate the combination, decision 680 branches to the "No" branch whereupon the process determines whether to continue (decision 690). If the process should continue, decision 690 branches to the "Yes" branch, which loops back to continue processing real-time data. This looping continues until processing should terminate, at which point decision 690 branches to the "No" branch whereupon FIG. 6 processing thereafter ends at 695.

FIG. 7 is an exemplary flowchart showing steps taken to evaluate possible cognitive services with possible machine learning models and determine an optimum combination to process user sample data. FIG. 7 processing commences at 700 whereupon, at step 710, the process selects M machine learning models corresponding to the N identified possible cognitive services (from FIG. 6). At step 720, the process retrieves key features for M machine learning models for each N identified possible cognitive service. At step 730, the process runs blind tests on the user sample data using N identified possible cognitive services with M machine learning models. At step 740, the process performs key feature (answer) comparisons between blind test results and provided sample data results. For example, the data may be passed to all M machine learning models and the results are recorded.

At step 750, the process compares the answers from each model M to ground truth and determines which model/cognitive service was the most accurate (optimum combination). FIG. 7 processing thereafter returns to the calling routine (see FIG. 6) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving, from a user system, a set of user sample data corresponding to a user application executing on the user system;
   performing a plurality of tests on a plurality of cognitive services and a plurality of pre-trained machine learning models by inputting the user sample data into each of the plurality of cognitive services and each of the plurality of pre-trained machine learning models, wherein a different one of the plurality of pre-trained machine learning models is utilized during each one of the plurality of tests;
   selecting one of the plurality of cognitive services and at least one of the plurality of pre-trained machine learning models based, at least in part, on a plurality of test results generated from the plurality of tests;
   binding the selected at least one pre-trained machine learning model to the selected cognitive service; and
   in response to the binding, processing a set of user runtime data from the user system using the selected cognitive service and the selected at least one pre-trained machine learning model.

2. The method of claim 1 further comprising:
   prior to performing the plurality of tests on the user sample data:
      determining a data type of the user sample data; and
      selecting a subset of a plurality of cognitive services based on the data type; and
   in response to selecting the subset of the plurality of cognitive services:
      performing the plurality of tests on the user sample data using each of the subset of cognitive services and the plurality of pre-trained machine learning models.

3. The method of claim 1 further comprising:
   determining to assign a different pre-trained machine learning model to the cognitive service based on analyzing a set of results from the processing of the user runtime data; and
   dynamically binding the different pre-trained machine learning model to the cognitive service.

4. The method of claim 1 wherein each of the plurality of pre-trained machine learning models were trained prior to the performing of the plurality of tests and are unmodified during the performing of the plurality of tests, the selecting, and the binding.

5. The method of claim 1 further comprising:
   receiving the plurality of pre-trained machine learning models from a set of expert providers;
   storing the plurality of pre-trained machine learning models in an open catalog repository; and
   selecting the plurality of pre-trained machine learning models from the open catalog repository to perform the plurality of tests.

6. The method of claim 1 wherein the user sample data comprises a set of natural language queries.

7. An information handling system comprising:
   one or more processors;
   a memory coupled to at least one of the processors;
   a set of computer program instructions stored in the memory and executed by at least one of the processors in order to perform actions of:
      receiving, from a user system, a set of user sample data corresponding to a user application executing on the user system
      performing a plurality of tests on a plurality of cognitive services and a plurality of pre-trained machine learning models by inputting the user sample data into each of the plurality of cognitive services and each of the plurality of pre-trained machine learning models, wherein a different one of the plurality of pre-trained machine learning models is utilized during each one of the plurality of tests;
      selecting one of the plurality of cognitive services and at least one of the plurality of pre-trained machine learning models based, at least in part, on a plurality of test results generated from the plurality of tests;
      binding the selected at least one pre-trained machine learning model to the selected cognitive service; and
      in response to the binding, processing a set of user runtime data from the user system using the selected cognitive service and the selected at least one pre-trained machine learning model.

8. The information handling system of claim 7 wherein the processors perform additional actions comprising:
   prior to performing the plurality of tests on the user sample data:
      determining a data type of the user sample data; and
      selecting a subset of a plurality of cognitive services based on the data type; and
   in response to selecting the subset of the plurality of cognitive services:
      performing the plurality of tests on the user sample data using each of the subset of cognitive services and the plurality of pre-trained machine learning models.

9. The information handling system of claim 7 wherein the processors perform additional actions comprising:
- determining to assign a different pre-trained machine learning model to the cognitive service based on analyzing a set of results from the processing of the user runtime data; and
- dynamically binding the different pre-trained machine learning model to the cognitive service.

10. The information handling system of claim 7 wherein each of the plurality of pre-trained machine learning models were trained prior to the performing of the plurality of tests and are unmodified during the performing of the plurality of tests, the selecting, and the binding.

11. The information handling system of claim 7 wherein the processors perform additional actions comprising:
- receiving the plurality of pre-trained machine learning models from a set of expert providers;
- storing the plurality of pre-trained machine learning models in an open catalog repository; and
- selecting the plurality of pre-trained machine learning models from the open catalog repository to perform the plurality of tests.

12. The information handling system of claim 7 wherein the user sample data comprises a set of natural language queries.

13. A computer program product stored in a computer readable storage medium, comprising computer program code that, when executed by an information handling system, causes the information handling system to perform actions comprising:
- receiving, from a user system, a set of user sample data corresponding to a user application executing on the user system;
- performing a plurality of tests on a plurality of cognitive services and a plurality of pre-trained machine learning models by inputting the user sample data into each of the plurality of cognitive services and each of the plurality of pre-trained machine learning models, wherein a different one of the plurality of pre-trained machine learning models is utilized during each one of the plurality of tests;
- selecting one of the plurality of cognitive services and at least one of the plurality of pre-trained machine learning models based, at least in part, on a plurality of test results generated from the plurality of tests;
- binding the selected at least one pre-trained machine learning model to the selected cognitive service; and
- in response to the binding, processing a set of user runtime data from the user system using the selected cognitive service and the selected at least one pre-trained machine learning model.

14. The computer program product of claim 13 wherein the information handling system performs further actions comprising:
- prior to performing the plurality of tests on the user sample data:
  - determining a data type of the user sample data; and
  - selecting a subset of a plurality of cognitive services based on the data type; and
- in response to selecting the subset of the plurality of cognitive services:
  - performing the plurality of tests on the user sample data using each of the subset of cognitive services and the plurality of pre-trained machine learning models.

15. The computer program product of claim 13 wherein the information handling system performs further actions comprising:
- determining to assign a different pre-trained machine learning model to the cognitive service based on analyzing a set of results from the processing of the user runtime data; and
- dynamically binding the different pre-trained machine learning model to the cognitive service.

16. The computer program product of claim 13 wherein each of the plurality of pre-trained machine learning models were trained prior to the performing of the plurality of tests and are unmodified during the performing of the plurality of tests, the selecting, and the binding.

17. The computer program product of claim 13 wherein the information handling system performs further actions comprising:
- receiving the plurality of pre-trained machine learning models from a set of expert providers;
- storing the plurality of pre-trained machine learning models in an open catalog repository; and
- selecting the plurality of pre-trained machine learning models from the open catalog repository to perform the plurality of tests.

* * * * *